United States Patent Office 3,825,524
Patented July 23, 1974

3,825,524
PROCESS FOR POLYMERIZATION OF OLEFINS AND CATALYSTS THEREFOR
Shigeru Wada, Otake, Hidesaburo Oi, Yamaguchi, Norio Matsuzawa, and Hiroshi Nishimura, Otake, Japan, assignors to Mitsui Petrochemical Industries, Ltd., Tokyo, Japan
No Drawing. Filed Sept. 30, 1971, Ser. No. 185,442
Claims priority, application Japan, Oct. 2, 1970, 45/85,932
Int. Cl. B01j 11/84; C08f 1/56, 3/10
U.S. Cl. 260—93.5 S         10 Claims

ABSTRACT OF THE DISCLOSURE

A process for the polymerization of olefins which comprises polymerizing or copolymerizing olefins in the presence of a catalyst consisting essentially of:

(A) a titanium trichloride composition obtained by extracting a crude titanium trichloride composition including an aluminum-containing inorganic substance, such crude titanium trichloride composition being prepared by reducing titanium tetrachloride with an organoaluminum chloride expressed by the following formula.

$$R_{3-n}AlCl_n$$

wherein R is an alkyl group of 1–6 carbon atoms or an aryl group, and $n$ is a positive number greater than 0 (zero) but smaller than 3, with a mixed solvent composed of (i) a main solvent selected from the group consisting of saturated aliphatic hydrocarbons, aromatic hydrocarbons, halogenated aromatic hydrocarbons, trichloroethylene and carbon disulfide and (ii) an auxiliary solvent selected from the group consisting of oxygen-containing organic compounds, nitrogen-containing organic compounds, silicon-containing organic compounds and thioethers, and separating the titanim trichloride composition from the extract; and (B) an organoaluminum compound.

This invention relates to an improved catalyst for polymerization of olefins having a sufficiently high polymerizing activity and to an improved process for polymerizing or copolymerizing olefins with use of such improved catalyst.

The Ziegler-Natta catalysts have been well known as catalysts for preparing olefin polymers. Also it has been well known that a solid titanium trichloride composition obtained by the reaction between titanium tetrachloride and an organoaluminum compound may be used as a transition metal component of such catalyst for polymerizing or copolymerizing α-olefins such as ethylene and propylene. However, the catalysts comprising such titanium trichloride composition as a transition metal component are inferior in the activity of polymerizing α-olefins. Accordingly, many proposals have been made with regard to improvements of this titanium trichloride catalyst component, but no product giving sufficient results has been obtained.

It has now been found that a titanium trichloride composition obtained by extracting a crude trichloride composition including an aluminum-containing inorganic substance, such crude titanium trichloride composition being prepared by reducing titanium tetrachloride with an organoaluminum chloride expressed by the following formula $$R_{3-n}AlCl_n$$

wherein R is an alkyl group of 1–6 carbon atoms or an aryl group, preferably phenyl, and $n$ is a positive number greater than 0 (zero) but smaller than 3, with a mixed solvent composed of (i) a main solvent selected from the group consisting of saturated aliphatic hydrocarbons, aromatic hydrocarbons, halogenated aromatic hydrocarbons, trichloroethylene and carbon disulfide and (ii) an auxiliary solvent selected from the group consisting of oxygen-containing organic compounds, nitrogen-containing organic compounds, silicon-containing organic compounds and thioethers, and separating the titanium trichloride composition from the extract, can provide a highly improved catalyst for polymerization of olefins when it is combined with an organoaluminum compound.

It has been also found that the use of a mixed solvent composed of the above-mentioned main solvent (i) and auxiliary solvent (ii) and the separation of the titanium trichloride composition from the extract after the extraction and prior to its use are indispensable and significant but the kinds of solvents (i) and (ii) used are not particularly critical in this invention and these solvents may be relatively optionally chosen within very broad ranges.

A primary object of this invention is to provide a catalyst comprising as the transition metal component a titanium trichloride composition obtained by reducing titanium tetrachloride with an organoaluminum chloride and having a highly improved catalytic activity.

Another object of the invention is to provide an improved process for polymerizing or copolymerizing olefins with use of such improved catalyst.

The crude titanium trichloride composition to be used in this invention may be synthesized by any of the following methods:

(a) A method comprising reducing titanium tetrachloride with an organoaluminum chloride at a temperature ranging from −10° C. to +80° C.
(b) A method comprising reducing titanium terachloride with an organoaluminum chloride at a temperature ranging from 80° C. to 200° C.
(c) A method comprising reducing titanium tetrachloride with an organoaluminum chloride at a temperature below 80° C. and subjecting the resulting brown or reddish brown precipitate to the heat treatment at a temperature exceeding 30° C.

It is preferred to use a titanium trochloride composition prepared by method (b) or (c).

Either compounds expressed by the following formula $$R_{3-n}AlCl_n$$

wherein R and $n$ are as defined above, or blends having a composition corresponding with the above formula, for instance, a blend of an organoaluminum compound and aluminum chloride or a composition of two or more kinds of organoaluminum compounds having a composition corresponding with the above formula, may be used as the organic aluminum chloride for reduction of titanium tetrachloride.

Examples of such organoaluminum chloride compounds include alkyl or aryl aluminum dichlorides such as methyl aluminum dichloride, ethyl aluminum dichloride, propyl aluminum dichloride, n-butyl aluminum dichloride, isobutyl aluminum dichloride, hexyl aluminum dichloride, phenyl aluminum dichloride and tolyl aluminum dichloride; alkyl or aryl aluminum sesquichlorides such as methyl aluminum sesquichloride, ethyl aluminum sesquichloride, n-butyl aluminum sesquichloride and phenyl aluminum sesquichloride; and dialkyl or diaryl aluminum chlorides such as dimethyl aluminum chloride, diethyl aluminum chloride, di-n-butyl aluminum chloride, dihexyl aluminum chloride, diphenyl aluminum chloride and ditolyl aluminum chloride. These compounds may be used singly or in the form of an admixture of two or more of these compounds. Use of alkyl aluminum sesquichlorides and alkyl aluminum dichlorides is especially preferred.

The titanium trichloride composition obtained by the reduction of titanium tetrachloride should be one including an aluminum-containing inorganic substance (which is presumed to be aluminum chloride). It is preferred that the reduced titanium trichloride composition includes such inorganic substance in an amount of about 0.2 to about 1.0 mole calculated as aluminum atom per mole of the titanium.

In this invention, the content of the aluminum-containing inorganic substance is determined by the following method.

In the case of the titanium trichloride composition obtained by reduction of titanium tetrachloride with an organoaluminum chloride according to method (a) above, the total aluminum content in the composition is determined by chemical analysis. Then, the titanium trichloride composition is dissolved in methanol and the amount of the aluminum-carbon bond is determined from the intensity an absorption band at a wavelength of 400 m$\mu$ by observing the visible ray absorption spectrum of the solution. The so determined amount is designated as the organic aluminum content. The content of the aluminum in the inorganic substance is calculated by subtracting the organic aluminum content from the total aluminum content.

In the case of the titanium trichloride composition synthesized by method (b) or (c) above, the composition is dissolved in methanol and an adsorption is observed at a wavelength of 430 m$\mu$ in the visible ray absorption spectrum of the solution, it is determined that the composition includes an aluminum-containing inorganic substance.

In some cases, in order to obtain such aluminum trichloride composition it is necessary to adjust the molar ratio between an organoaluminum chloride and titanium tetrachloride TiCl$_4$. For instance, when an alkyl or aryl aluminum dichloride is used as a reducing agent, any molar ratio may be adopted. In short, the molar ratio of the reducing agent to titanium chloride may be greater than 0 (zero). However, in the case of an alkyl or aryl aluminum sesquichloride, the molar ratio of $$R_3Al_2Cl_3/TiCl_4$$

is generally greater than 0 but smaller than 2, preferably greater than 0 but up to 1.0, more preferably greater than 0 but up to 0.67, most preferably greater than 0 but up to 0.5. In the case of a dialkyl or diaryl aluminum chloride, the molar ratio of $(R_2AlCl)_2/TiCl_4$ is generally greater than 0 but smaller than 1.0, preferably greater than 0 and up to 0.5, most preferably greater than 0 and up to 0.4.

Other reduction conditions are not particularly citical. The reduction may be conducted in the absence of a solvent, but generally the reduction is carried out in the presence of an inert solvent. As the inert solvent hexane, kerosene, benzene, toluene and similar hydrocarbons may be exemplified.

It is preferable that the titanium trichloride composition obtained by the reduction of titanium tetrachloride is preliminarily washed with a hydrocarbon such as hexane, heptane, benzene and toluene, before it is extracted with the mixed solvent of the present invention.

In this invention, a crude titanium trichloride composition including an aluminum-containing inorganic substance, which is prepared by reducing titanium trichloride with the above-mentioned organoaluminum chloride, is extracted with a mixed solvent composed of (i) a main solvent selected from the group consisting of saturated aliphatic hydrocarbons, aromatic hydrocarbons, halogenated aromatic hydrocarbons, trichloroethylene and carbon disulfide, and (ii) an auxiliary solvent selected from the group consisting of oxygen-containing organic compounds, nitrogen-containing organic compounds, silicon-containing organic compounds and thioethers.

Improvements intended in this invention cannot be attained either when the above extraction step is omitted or when the extraction is conducted with the main solvent (i) alone or the auxiliary solvent (ii) alone. This fact suggests that substantial changes different from those brought about by mere washing for removal of unreacted titanium tetrachloride or excessive organoaluminum occur in the titanium trichloride composition by the extraction of such composition with the above-mentioned mixed solvent composed of the main solvent (i) and auxiliary solvent (ii).

It is preferable that the main solvent occupies more than 50% by weight of the mixed solvent and the mixed solvent is used in an amount such that the amount of the main solvent is 2–50 parts by weight per part by weight of the crude titanium trichloride composition.

The extraction can usually be conducted at a temperature ranging from room temperature to the boiling point of the main solvent. The extraction may be performed by the batchwise extraction followed by removal of the extract by decantation, or a counter-current continuous extraction. Whatever method is adopted in the extraction, it is necessary to separate the extract from the titanium trichloride composition as sufficiently as possible. When such separation is not effected and the solvent is removed merely by evaporation, the intended object of this invention cannot be attained. Accordingly, in some cases, it is preferable to conduct the washing with the main solvent after the extraction with the mixed solvent.

Generally, the titanium trichloride composition obtained by the above-mentioned extraction is preserved in the state suspended in an inert solvent such as hexane, heptane and kerosene, or in the solid state after being dried in an inert atmosphere under atmospheric or reduced pressure.

It is important that the mixed solvent for use in the extraction is composed of a main solvent and an auxiliary solvent. The kinds of the main and auxiliary solvents may be optionally chosen within very broad ranges.

As the main solvents the following compounds may be exemplified.

Saturated aliphatic hydrocarbons of 3–20 carbon atoms, such as propane, butane, pentane, hexane, 3-methylpentane, 2,3-dimethylbutane, n-heptane, 2-methylhexane, n-octane, iso-octane, n-decane, n-dodecane, heptadecane, n-eicosane and kerosene;

Aromatic hydrocarbons of 6–20 carbon atoms which may be substituted by alkyl radicals having 1–20 carbon atoms, aralkyl radicals having 7–15 carbon atoms or aryl radicals having 6–8 carbon atoms, such as benzene, toluene, xylene, ethylbenzene, cumene, ethyl toluene, trimethylbenzene, tetramethylbenzene, hexamethylbenzene, 1,2,4,5-tetraisopropylbenzene, cymene, diphenyl, diphenylmethane, diphenylethane, triphenylmethane, naphthalene, α-methylnaphthalene, β-methylnaphthalene, 2,6-dimethylnaphthalene and 1-(n-dodecyl)naphthalene;

Halogenated aromatic hydrocarbons of 6–16 carbon atoms, such as chlorobenzene, bromobenzene, iodobenzene, fluorobenzene, o-, m- and p-dichlorobenzenes, o-, m- and p-dibromobenzenes, o-, m- and p- diiodobenzenes, 1,2,4,5-tetrachlorobenzene, hexachlorobenzene, pentabromobenzene, 2-fluoro-1-chlorobenzene, 4-bromo-1-iodobenzene, o-, m- and p-fluorotoluenes, o-, m- and p-bromotoluenes, 2-chloro-m-xylene, 1,2,4,5-tetramethyl-3-chlorobenzene, amyl-4-bromobenzene, benzyl chloride, benzilidene chloride, 1-chloronaphthalene. 1-bromonaphthalene, 1-fluoronaphthalene, 5-chlorotetraline, 2-bromodihydronaphthalene, 1,2,3,4,5,8-hexachlorotetraline, 1-chloro-2-methylnaphthalene, 1 - chloro-2-phenylnaphthalene, 1-chloro-(4-chloromethyl)-naphthalene, 1,4-dichloronaphthalene, 2,4-dibromo-1-chloronaphthalene, 1,3,6,7-tetrabromonaphthalene, octachloronaphthalene, 2-chloroanthracene, 1-chloroanthracene, 2,3-dibromoanthracene and 1,9,10-trichloroanthracene; and Trichloroethylene and carbon disulfide.

In this invention use of the aromatic hydrocarbons exemplified above is preferred.

As the auxiliary solvent the following compounds may be exemplified:

Oxygen-containing organic compounds selected from the group consisting of aliphatic ethers, aromatic ethers, aliphatic carboxylic acid esters, aromatic carboxylic acid esters, aliphatic alcohols, phenols, aliphatic carboxylic acids, aromatic carboxylic acids, aliphatic carboxylic acid halides, aromatic carboxylic acid halides, aliphatic ketones, aromatic ketones, aliphatic aldehydes, and aromatic aldehydes;

Nitrogen-containing organic compounds selected from the group consisting of aliphatic amines, aromatic amines, heterocyclic amines, aromatic isocyanates and aromatic azo compounds;

Silicon-containing organic compounds selected from the group consisting of tetrahydrocarbyl silanes, organohydrogenosilanes, organohalogenosilanes, alkoxy silanes, aryloxy silanes, silanol carboxylates, straight chain siloxanes, cyclic polysiloxanes, aminosilanes, silazanes and isocyanate silanes; and thioethers selected from the group consisting of aliphatic thioethers and aromatic thioethers.

More specifically, the following compounds may be used as auxiliary solvents:

As oxygen-containing organic compounds:

Saturated aliphatic monoethers of 2–32 carbon atoms having an alkyl radical, such as dimethyl ether, diethyl ether, di-n-propyl ether, diisopropyl ether, di-n-butyl ether, diisobutyl ether, methyl ethyl ether, methyl n-butyl ether, n-butyl n-pentyl ether, dioctyl ether, isoamyl cetyl ether, dicetyl ether, 2,2'-dibromodiethyl ether and 2,2'-dichlorodiethyl ether;

Aliphatic ethers of 3–20 carbon atoms having at least one unsaturated aliphatic hydrocarbon radical, such as 2-methoxybutene, methyl methacryl ether, allyl ethyl ether, allyl butyl ether, 2-ethoxypropene, 6-methoxy-1-hexene, ethyl vinyl ether, methyl vinyl ether, 1-methoxy-2-octene, undecenyl ethyl ether and didecenyl ether;

Aromatic ethers of 7–16 carbon atoms having a saturated alkyl or aryl radical, such as anisole, phenetole, isopropyl phenyl ether, tolyl methyl ether, diphenyl ether, ditolyl ether, dimethoxybenzene, 1-ethoxynaphthalene and 1-phenoxynaphthalene;

Monoethers and diethers of 7–16 carbon atoms which are halogenated and contain at least one aromatic radical, such as chloroanisole, bromoanisole, 4,4'-dibromophenyl ether, 2,4-dichloroanisole, 3,5-dibromoanisole, 2,6-diiodoanisole, 2,3,5-trichloroanisole and bromophenetole;

Saturated aliphatic monocarboxylic acid saturated alkyl esters having an aliphatic monocarboxylic acid residual group of 1–21 carbon atoms and a saturated alkyl radical of 1–16 carbon atoms, such as methyl formate, ethyl formate, butyl formate, ethyl acetate, n-butyl acetate, sec-butyl acetate, octyl acetate, butyl butyrate, methyl caproate, amyl caprylate, ethyl laurate, methyl palmitate, ethyl stearate and cetyl palmitate;

Saturated aliphatic monocarboxylic acid unsaturated alkyl esters having a saturated aliphatic monocarboxylic acid residual group of 1–8 carbon atoms and an unsaturated alkyl radical of 2–12 carbon atoms, such as vinyl acetate, allyl acetate, propenyl acetate, undecenyl acetate and hexenyl propionate;

Unsaturated aliphatic monocarboxylic acid alkyl esters having an unsaturated aliphataic monocarboxylic acid residual group of 2–12 carbon atoms and a saturated or unsaturated alkyl radical of 1–10 carbon atoms, such as methyl acrylate, n-amyl acrylate, n-decyl acrylate, ethyl crotonate, methyl isocrotonate, methyl methacrylate, n-butyl methacrylate, methyl undecylenate, methyl 3-methyl-tetradecenate-(13), phenyl acrylate and vinyl undecylenate;

Aromatic monocarboxylic acid saturated alkyl esters having an aromatic monocarboxylic acid residual group of 7–18 carbon atoms and an alkyl radical of 1–20 carbon atoms, such as methyl benzoate, ethyl benzoate, butyl benzoate, n-propyl benzoate, iso-propyl benzoate, sec-butyl benzoate, tert-butyl benzoate, n-amyl benzoate, isoamyl benzoate, neopentyl benzoate, ethyl o-, m-, p-toluylates, butyl o-, m- and p-toluylates, ethyl o-, m- and p-bromobenzoates, ethyl o-, m- and p-chlorobenzoates, ethyl 1,2-naphthoate and butyl 1,2-naphthoate;

Saturated aliphatic monoalcohols of 1–18 carbon atoms, such as methanol, ethanol, n-propanol, isopropanol, n-butanol, isobutanol, sec-butanol, tert-butanol, 1-pentanol, isoamyl alcohol, neopentyl alcohol, 3-pentanol, 3-methyl-butanol-2, hexanol, octanol, lauryl alcohol, cinnamyl alcohol, phenyl ethanol, cetyl alcohol, ethoxy ethanol, 2-chloropropanol, 2-bromopropanol, 3-chloropropanol, ethoxybutanol and 4-chlorobutanol;

Monohydric and dihydric phenols of 6–16 carbon atoms, such as phenol, o-, m- and p-cresols, thymol, o-chlorophenol, o-bromophenol, p-chlorophenol, p-bromophenol, tribromophenol, catechol, resorcinol, guaiacol, eugenol, isoeugenol, o-allylphenol, 1- and 2-naphthols and anthranol;

Saturated aliphatic monoketones of 3–20 carbon atoms, such as acetone, methyl ethyl ketone, methyl propyl ketone, methyl isobutyl ketone, metyl tert-butyl ketone, ethyl butyl ketone, dibutyl ketone, methyl amyl ketone, ethyl amyl ketone, 2-chlorobutyl ketone, ethyl 2-chlorobutyl ketone and 2-ethoxyethyl methyl ketone;

Saturated aliphatic diketones of 4–12 carbon atoms, such as acetylacetone, diacetyl and acetonylacetone;

Aromatic monoketones of 7–18 carbon atoms, such as acetophenone, ethyl phenyl ketone, benzophenone, dyp-none, cinnamyl methyl ketone, cinnamyl ethyl ketone, n-butyl phenyl ketone, tert-butyl phenyl ketone, propyl phenyl ketone, anthraquinone, anthrone, 2 - acetylnaphthalene, naphthoquinone, benzoquinone and fluorenone;

Aromatic monocarboxylic acids of 7–18 carbon atoms, such as benzoic acid, o-, m- and p-toluic acids, o-, m- and p-chlorobenzoic acids, o-, m- and p-bromobenzoic acids and 1-, 2-naphthoic acids;

Saturated aliphatic monocarboxylic acids of 1–20 carbon atoms, such as formic acid, acetic acid, propionic acid, valeric acid, octylic acid, undecylenic acid and stearic acid;

Saturated aliphatic carboxylic acid halides of 2–12 carbon atoms, such as acetic acid chloride, propionic acid chloride and lauric acid chloride;

Aromatic carboxylic acid halides of 7–15 carbon atoms, such as benzoic acid chloride, o-, m- and p-toluic acid chlorides, o-, m- and p-chlorobenzoic acid chlorides and 1- and 2-naphthoic acid chlorides; and Alkyl aldehydes in which the alkyl group has 1–6 carbon atoms and aromatic aldehydes in which the aryl group has 6–7 carbon atoms, such as acetaldehyde, propionaldehyde and butyl aldehyde, benzaldehyde and tolualdehydes.

As nitrogen-containing organic compounds:

Saturated aliphatic tertiary amines of 3–30 carbon atoms, preferably 6–30 carbon atoms, such as trimethylamine, tributylamine, tripropylamine and trihexylamine;

Aromatic tertiary amines of 6–30 carbon atoms, such as N,N-dimethylaniline and triphenylamines;

Heterocyclic amines of 5–18 carbon atoms, such as pyridine, 2-picoline, 3-picoline, 5-ethyl-2-methyl pyridine, 2-phenyl pyridine, 1,2,3,4-tetramethylpyridine, 2-chloropyridine, 2-bromopyridine, 3-chlolopyridine, 3 - chloropyridine, 3-iodopyridine, 3,4-dichloropyridine, 2,3,4-trichloropyridine, 2,3,4,6-tetrachloropyridine, pentachloropyridine, 2,3-dibromopyridine, 2,3,5-tribromopyridine, 2-chloro-6-methyl pyridine, 2-chlorophenyl pyridine, quinoline, isoquinoline, 2-methylquinoline, 3-phenyl quinoline, 6-methyl quinoline, 2,4-dimethyl quinoline, 4,6-dimethyl-2-phenyl quinoline, 3-fluoroquinoline, 4-bromoquinoline, 2,6-dichloroquinoline, 5,6-diiodiquinoline, 6 - bromo-2-chloroquinoline, 1-methylisoquinoline, 1,3-dimethylisoquinoline, 4-bromoisoquinoline, acridine and 2-chloroacridine;

Aromatic monoisocyanates of 7–11 carbon atoms, such as phenyl isocyanate, toluyl isocyanate, α-naphthyl isocyanate, β-naphthyl isocyanate and 2,4-dimethyl phenyl isocyanate; and Aromatic azo compounds of 12–20 carbon atoms having no substituent other than hydrocarbon radicals or halogens, such as azobenzee, o-, m- and p-azotoluenes, 1,1'-azonaphthalene and 2,2'-azonaphthalene.

As thioethers:

Aliphatic thioethers of 2–10 carbon atoms and aromatic thioethers of 7–12 carbon atoms, such as diethyl thioether, dibutyl thioether, methyl ethyl thioether, propyl butyl thioether, diamyl thioether, isopropyl thioether, thioanisole, thiophenetole, methyl tolyl thioether, benzyl methyl thioether, isopropyl phenyl thioether and diphenyl thioether.

As silicon-containing organic compounds (which in this invention include oxygen, nitrogen or sulfur besides silicon):

Monomer type compounds (which contain one silicon atom in the molecule) represented by the general formula:

$$R_nSiY_{4-n}$$

wherein R's are alkyl or aryl radicals, Y's are substituents of various kinds, and $n$ is 1 to 4.

$n=4$: Tetrahydrocarbylsilanes of 4–50 carbon atoms having saturated alkyl radicals and/or aryl radicals, such as tetramethylsilane, tetraethylsilane, tetrabutylsilane, tetraundecylsilane, tetra-n-octadecylsilane, ethyltrimethylsilane, trimethylpropylsilane, diethyldiphenylsilane, ethyltriphenylsilane, tetraphenylsilane, tetra (o-tolyl) silane, tetrabenzylsilane, tetra(p-diphenyl)silane and 2-naphthyltriphenylsilane.

$n=4$: Tetrahydrocarbylsilanes of 5–28 carbon atoms having an unsaturated alkyl radical such as trimethylvinylsilane, isopropenyltrimethylsilane, vinyltriphenylsilane, benzylvinylsilane and trimethylallylsilane.

$n=1$ to 3, Y-hydrogen: Saturated or unsaturated alkyl or aryl hydrogenosilanes of up to 30 carbon atoms having at least one Si-H bond, such as methylsilane, dimethylsilane, trimethylsilane, tri-n-propylsilane, diphenylsilane, tritolylsilane and diphenylvinylsilane.

$n=1$ to 3, Y=halogens: Saturated or unsaturated alkyl halogenosilanes of 3–30 carbon atoms or aryl halogenosilanes of 6–30 carbon atoms having at least one Si-halogen bond, such as trichloromethylsilane, dichloromethylsilane, tripropylchlorosilane, diallyldichlorosilane, phenyltrichlorosilane, diphenyldichlorosilane, triphenylchlorosilane, tribenzylchlorosliane, triethylfluorosilane, diphenyldifluorosilane, triethylbromosilane, diphenyldibromosilane, triethyliodosilane, chlorodifluoromethylsilane, chloroethyldifluorosilane and dichlorofluoropropylsilane.

$n=1$ to 3, Y=NH$_2$: Trialkyl silyl amines of 3–18 carbon atoms or triaryl silyl amines of up to 30 carbon atoms or their N-alkylamino derivatives, such as triethylsilylamine, tripropylsilylamine, triphenylsilylamine, trimethyl (N-methylamino)silane or other trialkyl (N-alkylamino) silanes and trimethyl (N,N-diethylamino)silane.

$n=1$ to 3, Y=alkoxy or aryloxy: alkoxy silanes of 4–20 carbon atoms or aryloxy silanes of 6–40 carbon atoms having at least one Si—O—C bond, such as methoxymethylsilane, dimethoxymethylsilane, trimethoxymethylsilane, diethoxydimethylsilane, ethoxytriethylsilane, diethoxydiethylsilane, trimethylphenoxysilane and triethylphenoxysilane.

$n=1$ to 3, Y=OCOR (R: alkyl, aryl): $C_1$-$C_{10}$ aliphatic or $C_7$-$C_{11}$ aromatic monocarboxylic acid estesr of $C_3$-$C_{10}$ trialkyl, $C_8$-$C_{20}$ alkylaryl or $C_{18}$-$C_{30}$ triaryl silanols, such as trimethylacetoxysilane, triethylacetoxysilane, triphenylacetoxysilane, trimethylbenzoyloxysilane, trimethylpropionylsilane and triethylcaproylsilane.

$n=1$ to 3, Y=NCO (isocyanate): Organosilicon monoisocyanates having $C_3$-$C_{10}$ trialkyl, $C_8$-$C_{15}$ dialkylaryl or $C_{18}$-$C_{30}$ triaryl, such as trimethyl silicon isocyanate, dimethyl silicon isocyanate, tributyl silicon isocyanate and triphenyl silicon isocyanate.

Polymer type compounds (which contain at least two silicon atoms in the molecule):

Polysilmethylenes represented by the formula $$CH_3SiCH_2[(CH_3)_2SiCH_2]_xSi(CH_3)_3$$

(wherein $x$ is up to 10), such as hexamethyldisilmethylene, hexaethyldisilmethylene, hexa-n-propyldisilmethyl-decamethyltetrasilmethylene and dodecamethylpentasilmethylene are typical, and polysilmethylenes represented by the general formula $R_3SiCH_2[R_2SiCH_2]_nSiR_3$ (wherein R's are alkyl or aryl radicals).

Linear polyalkyl polysilanes of 6–80 carbon atoms or polyaryl polysilanes of up to 80 carbon atoms, such as hexamethyldisilane, sym-diethyldi-n-propyldiphenyldisilane, sym-diethyldi-n-propyldibenzyldisilane, hexaphenyldisilane, hexa(p-diphenyl)disilane and octaphenyltrisilane.

Derivatives of above polysilanes such as alkoxy polysilanes, e.g., 1,1,2,2-tetramethyl - 1,2 - diethoxydisilane and pentamethylethoxydisilane.

Polyalkyl and/or polyaryl cyclopolysilanes of 12–120 carbon atoms, such as dodecamethylcyclohexasilane and octaphenylcyclotetrasilane.

Dialkylpolysiloxanes, alkylarylpolysiloxanes and diarylpolysiloxanes which are linear molecules represented by the general formula:

$$R(R'R''SiO)_xSiR_3$$

wherein R, R', R'' which may be the same or different, represent alkyl radical of 1–4 carbon atoms, aryl radical of 6–8 carbon atoms or hydrogen, and $x$ stands for an integer of 1–1000, such as hexamethyldisiloxane, decamethyltetrasiloxane, tetracosamethylundecasiloxane, 3-hydroheptamethyltrisiloxane, 3,5 - dihydrooctamethyltetrasiloxane, 3,5,7 - trihydrononamethylpentasiloxane, tetramethyl - 1,3 - diphenyldisiloxane, pentamethyl-1,3,5-triphenyltrisiloxane, hexaphenyldisiloxane and octaphenyltrisiloxane.

Compounds obtained by halogenating both ends of the molecule of the above compounds, such as α,ω-dihaloalkylpolysiloxanes represented by the general formula:

$$X(R_2SiO)_xSiR_2X$$

wherein X is a halogen atom and $x$ is 1 to 1000, e.g., 1,3-dichlorotetramethyldisiloxane, 1,5 - dichlorohexamethyltrisiloxane and 1,7-dichloroctamethyltetrasiloxane.

Alkylcyclopolysiloxanes represented by the general formula:

$$(R'''HSiO)_y$$

wherein R''' is an alkyl radical of 1–4 carbon atoms $y$ stands for an integer of 3 to 8, such as 2,4,6-trimethylcyclotrisiloxane and 2,4,6,8-tetramethylcyclotetrasiloxane.

Alkylcyclopolysiloxanes represented by the general formula:

$$(R''''_2SiO)_z$$

wherein R'''' is an alkyl radical of 1–4 carbon atoms, $z$ stands for an integer of 3 to 9, such as hexamethylcyclotrisiloxane, octamethylcyclotetrasiloxane, decamethylcyclopentasiloxane and dodecamethylcyclohexasiloxane.

Arylcyclopolysiloxanes represented by the general formula:

$$(Q_2SiO)_p$$

wherein Q is an aryl radical of 6–8 carbon atoms and $p$ stands for an integer of 3 to 6, such as 1,3,5-triphenyl-1,3,5 - trimethylcyclotrisiloxane, hexaphenylcyclotrisiloxane and octaphenylcyclotetrasiloxane.

Alkyl or aryl polysilazanes having 6–50 carbon atoms having an Si—N—Si bond and a molecular weight not more than 1000, such as hexamethylsilazane, hexamethyltrisilazane, N-methylhexamethyldisilazane, octamethylcyclotetrasilazane, hexaphenylcyclotrisilazane, hexaethylcyclo trisilazane, hexaphenylcyclotrisilazane, hexa(n-butyl) cyclotrisilazane and hexaphenylcyclotrisilazane.

Especially preferable auxiliary solvents include alkyl ethers having 1–4 carbon atoms on each alkyl group, such as diethyl ether, ethylbutyl ether and dibutyl ether; alkylaryl ethers having an alkyl group of 1–2 carbon atoms and an aryl group of 6–7 carbon atoms in the molecule, such as anisole and phenetol and its haloderivatives such as o-chloroanisole and p-chloroanisole; diaryl ethers such as diphenyl ether; aliphatic ketones having 1–4 carbon atoms on each alkyl group, such as acetone, methyl ethyl ketone and methyl isobutyl ketone; alicyclic ketones such as cyclohexanone; alkyl esters of aliphatic carboxylic acids wherein the alkyl group may be saturated or unsaturated one having 1–4 carbon atoms and the carboxylic acid is saturated one having 1–4 carbon atoms, such as ethyl acetate, butyl acetate, butyl formate and allyl acetate; heterocyclic organic nitrogen compounds, having one nitrogen atom and 4–9 carbon atoms in the nucleus, such as pyrrole, pyridine, α-picoline and quinoline; aromatic tertiary amines whose nitrogen atom is bonded to an alkyl group having 1–2 carbon atoms, such as N,N-dimethyl aniline; and linear or cyclic polysiloxanes containing the

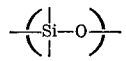

linkage in the molecule wherein each silicon atom is bonded to an alkyl, aryl and/or acyloxy group, such as dimethyl polysiloxanes, methylphenyl polysiloxanes, phenylacetoxypolysiloxanes, methylphenylacetoxy polysiloxanes which are liquid under ordinary conditions.

The amount of the auxiliary solvent used is not particularly critical but it is preferred to use it in an amount, per mole of the crude titanium trichloride composition, of 0.01–10.0 moles in the case of an ether or thioether, 0.01–5.0 moles in the case of a ketone or ester, 0.005–0.3 mole in the case of an alcohol, 0.005–0.2 mole in the case of a phenol or aldehyde, 0.005–0.5 mole in the case of an acid halide or organic carboxylic acid, 0.01–0.5 mole in the case of a nitrogen-containing heterocyclic compound or aromatic tertiary amine, 0.01–0.3 mole in the case of an aliphatic tertiary amine, isocyanate, azo compound or nitrile, 0.05–5.0 moles in the case of an oragnoalkoxysilane, organoaryloxysilane or organopolysiloxane, 0.02–2.0 moles in the case of an organosilanol carboxylate, organosilazane or organosilthiane, or 0.02–1.0 mole in the case of an organosilanol or organoisocyanosilane. In the case of organopolysiloxanes, one

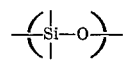

unit is counted as one mole. When a plurality of auxiliary solvents are used, it is preferred to use each of them in the amounts described above.

In this invention, polymerization or copolymerization of olefins is conducted in the presence of a modified Ziegler-Natta type catalyst consisting essentially of (A) a titanium component obtained by extracting the abovementioned crude titanium trichloride composition including an aluminum-containing inorganic substance with the abovementioned mixed solvent composed of the main and auxiliary solvents and separating the titanium trichloride composition from the extraction system and (B) an organoaluminum compound.

Any of organoaluminum compounds which are known as one component of the Ziegler-Natta type catalyst may be used in this invention. Examples of such organoaluminum compounds include trialkylaluminum compounds, dialkylaluminum halides, dialkylaluminum alkoxides, alkylaluminum alkoxy halides, alkylaluminum dihalides, alkylaluminum sesquihalides, reaction products of alkylaluminum dihalides with alkali metal halides or alkali metal complex fluorides of transition metals, and reaction products of alkylaluminum dihalides with electron-donors. Examples of such electron-donors are introduced in, for instance, the specifications of U.S. Pats. 3,081,287; 3,116,274 and 3,230,208.

Olefin monomers to be polymerized with the catalyst of this invention are, for instance ethylene, propylene, 1-butene, 4-methyl-1-pentene, styrene, 1-pentene and 3-methyl-1-butene. The catalyst may also be used for the copolymerization of ethylene with propylene, ethylene with 1-butene, ethylene with 1-hexene, propylene with styrene or propylene with 1-butene.

The polymerization of olefins with use of the catalyst of this invention may be performed by any known means under known conditions. For instance, the polymerization may be performed at a temperature of 20–100° C. and a pressure ranging from normal atmospheric pressure to 100 kg./cm.². The polymerization may be carried out in an inert solvent, or in the absence of a solvent when a liquefied monomer to be polymerized acts as a solvent. The polymerization may be conducted either batchwise or continuously.

In conducting the polymerization of olefins according to this invention, hydrogen may be used as an agent for regulating the molecular weight of the resulting polymers. After completion of the polymerization, the catalyst is generally deactivated with a lower alcohol such as methanol, ethanol, butanol and isopropanol in a customary manner adopted in the conventional method using a Ziegler-Natta type catalyst. When the yield of the polymer per unit amount of the catalyst is large, this deactivating treatment may be omitted and the catalyst may merely be contacted with air or steam.

This invention will now be described in more detail by referring to Examples, but this invention is not at all limited by these Examples.

EXAMPLES 1–7 AND COMPARATIVE EXAMPLES 1–4

A separable flask of an inner capacity of 2 liters equipped with a stirrer, a dropping funnel, a thermometer, an inlet for nitrogen and an outlet for waste gas was charged with 1.5 liters of kerosene (boiling at 190–200° C.) and the system was sufficiently substituted with nitrogen. Then, 132 ml. of titanium tetrachloride were added to the flask and a prescribed amount of an ethylaluminum chloride listed in Table 1 was added dropwise at a prescribed temperature over a prescribed period under stirring from the dropping funnel. After completion of the dropwise addition, the temperature was raised to a prescribed level and the reaction was conducted for a prescribed period. The resulting solids were withdrawn by decantation and washed four times with nitrogen-substituted hexane. With use of a glass filter, the solids were separated into a hexane-insoluble solid and the hexane washing liquor. The solid was dried under reduced pressure at room temperature to obtain a modified titanium trichloride composition (which will be designated as "titanium trichloride composition (An)" in which n indicates the example number).

A 500-ml. separable flask equipped with a stirrer, a thermometer, an inlet for nitrogen and an outlet for waste gas was charged with 50 g. of the titanium trichloride composition (An), and 300 ml. of nitrogen-substituted toluene were added thereto. Then the temperature was raised to 70° C. under agitation, following which anisole was added in such an amount that the molar ratio of anisole to (An) based on titanium would be 0.5 and the extraction was conducted at 70° C. for 2 hours. The extract and extraction residue were separated in a nitrogen atmosphere with a G-3 glass filter, and the extraction residue on the filter was washed three times with 150 ml. of nitrogen-substituted toluene and dried under reduced pressure.

The resulting dried product (2.0 g.) and 10 millimoles of diethylaluminum chloride were added into a separable flask of a capacity of 1 liter equipped with a stirrer, a thermometer, an inlet for propylene and an outlet for waste gas and charged with 500 ml. of kerosene sufficiently substituted with nitrogen. The temperature was raised to 70° C. under agitation and propylene was introduced under atmospheric pressure for 2 hours to effect the polymerization of propylene.

After completion of the polymerization, propylene gas introduction was stopped and nitrogen gas introduction begun. After the temperature was lowered to room temperature, 100 ml. of methanol were added to the content of the flask to effect the deactivation of the catalyst. The polymer slurry was filtered, and the powdery solid on the filter was washed several times with methanol and dried at 70° C. under a reduced pressure of 50 mm. Hg. for 2 days to obtain a solid propylene polymer (Y). The amount of the polymer (S) dissolved in the filtrate was determined by heating the filtrate under reduced pressure to vaporize the solvent and measuring the amount of the residue. The stereospecificity (isostaticity index: I.I.) of the solid polymer (partial I.I.) was expressed in terms of percent by weight of the boiling n-heptane extraction residue to total polymer yield; and the stereospecificity of the total polymer (total I.I.) was calculated according to the following formula:

$$\text{Total I.I.} = (Y) \times (\text{I.I.}) / \{(Y) + (S)\} \times 100$$

Results are shown in Table 1.

For comparison, the polymerization was conducted in the same manner as above with use of a catalyst obtained without conducting the extraction of the crude titanium trichloride composition and with a catalyst obtained by conducting the extraction only with toluene in the absence of anisole. Results of these comparative runs are also shown in Table 1.

EXAMPLES 14–24 AND COMPARATIVE EXAMPLE 6

The titanium trichloride composition A–5 of Example 5 was extracted for 5 hours in the same manner as in Example 5 with use of a mixed solvent composed of toluene and an auxiliary solvent indicated in Table 3, and the polymerization of propylene was carried out in the same manner as in Example 5. Results are shown in Table 3.

TABLE 3

| | Extraction | | Propylene polymer | |
|---|---|---|---|---|
| | Auxiliary solvent | Auxiliary solvent/titanium mole ratio | Yield (g.) | Total I.I., percent |
| Example 14 | Butyl acetate | 0.4 | 65.4 | 93.0 |
| Example 15 | Acetone | 0.3 | 63.2 | 94.9 |
| Example 16 | Quinoline | 0.1 | 77.3 | 93.9 |
| Example 17 | Octamethylcyclotetrasiloxane | 0.5 | 68.1 | 93.2 |
| Example 18 | N-methylhexamethylsilazane | 0.2 | 69.9 | 94.0 |
| Example 19 | Thioanisole | 0.5 | 71.4 | 93.9 |
| Comparative example 6 | Not added | 0 | 49.3 | 92.0 |
| Example 20 | Ethyl ether | 0.3 | 64.9 | 92.8 |
| Example 21 | Tri-n-butyl amine | 0.5 | 72.1 | 93.3 |
| Example 22 | N,N-dimethyl aniline | 0.2 | 69.0 | 94.1 |
| Example 23 | Dimethyl thioether | 0.1 | 53.5 | 94.0 |
| Example 24 | Dimethyl polysiloxane [1] | 0.5 | 73.8 | 92.4 |

[1] Average molecular weight about 14,000.

EXAMPLE 25 AND COMPARATIVE EXAMPLE 7

Ethylene was polymerized under the same conditions as in Example 5 by employing as a catalyst 0.5 g. of the tita-

TABLE 1

| | | Reduction | | | | | Titanium trichloride composition | | Extraction washing | | Propylene polymer | |
|---|---|---|---|---|---|---|---|---|---|---|---|---|
| | | | Dropwise addition | | Reaction | | | | | | | |
| | Organoaluminum compound (ml.) | Al/Ti, mole ratio | Temperature (° C.) | Period (hr.) | Temperature (° C.) | Period (hr.) | Inorganic aluminum/titanium, molar ratio | Type | Main solvent | Auxiliary solvent | Total yield (g.) | I.I., percent |
| Example 1 | EtAlCl₂ (162) | 1.31 | 0 | 1 | 40 | 10 | 1.0 | A–1 | Toluene | Anisole | 78.3 | 83.1 |
| Comparative example 1 | EtAlCl₂ (162) | 1.31 | 0 | 1 | 40 | 10 | 1.0 | A–1 | do | do | 20.8 | 79.1 |
| Comparative example 2 | EtAlCl₂ (162) | 1.31 | 0 | 1 | 40 | 10 | 1.0 | A–1 | | | 20.4 | 79.3 |
| Example 2 | Et₃Al₂Cl₃ (230) | 1.82 | 0 | 2 | 40 | 10 | 0.20 | A–2 | Toluene | Anisole | 84.3 | 81.0 |
| Example 3 | Et₃Al₂Cl₃ (110) | 0.44 | 0 | 1 | 40 | 10 | 0.53 | A–3 | do | do | 92.5 | 83.4 |
| Example 4 | Et₃Al₂Cl₃ (100) | 0.75 | 150 | 0.5 | 150 | 5 | 0.43 | A–4 | do | do | 84.0 | 94.2 |
| Example 5 | A–3 was treated in kerosene at 140° C. for 2 hours, and washed and dried in customary method | | | | | | 0.43 | A–5 | do | do | 89.2 | 94.2 |
| Example 6 | Et₂AlCl (115) | 0.72 | 0 | 2 | 40 | 5 | 0.25 | A–6 | do | do | 70.9 | 80.4 |
| Example 7 | Et₂AlCl (70.5) | 0.47 | 0 | 2 | 40 | 5 | 0.43 | A–7 | do | do | 84.3 | 83.0 |
| Comparative example 3 | Et₂AlCl (70.5) | 0.47 | 0 | 2 | 40 | 5 | 0.43 | A–7 | do | | 39.2 | 77.8 |
| Comparative example 4 | Et₂AlCl (70.5) | 0.47 | 0 | 2 | 40 | 5 | 0.43 | A–7 | | | 38.8 | 77.2 |

NOTE.—Et=ethyl group.

EXAMPLES 8–13 AND COMPARATIVE EXAMPLE 5

The titanium trichloride composition A–5 of Example 5 was extracted for 4 hours in the same manner as in Example 5 except that a mixed solvent composed of a main solvent indicated in Table 2 and anisole was used instead of the mixed solvent composed of toluene and anisole (in the case of carbon disulfide, the extraction temperature was changed to 40° C.), and the polymerization of propylene was carried out with use of the resulting titanium trichloride composition in the same manner as in Example 5. Results are shown in Table 2.

TABLE 2

| | Main solvent used in extraction | Propylene polymer | |
|---|---|---|---|
| | | Total yield (g.) | Total I.I., percent |
| Example 8 | Kerosene | 65.3 | 93.8 |
| Example 9 | Chlorobenzene | 71.8 | 94.0 |
| Example 10 | Trichloroethylene | 60.3 | 95.1 |
| Example 11 | Carbon disulfide | 61.2 | 94.3 |
| Comparative Example 5 | Not added | 49.3 | 93.1 |
| Example 12 | Xylene | 87.5 | 94.3 |
| Example 13 | Heptane | 68.9 | 93.2 | nium trichloride composition A–5 of Example 5 and 2.5 millimoles of diethylaluminum chloride and by blowing in ethylene instead of propylene. The yield of the resulting polyethylene was 166 g. and the bulk density of the polymer was 0.389.

When the polymerization of ethylene was conducted in the same manner as above except that the un-extracted titanium trichloride composition was used instead of the titanium trichloride composition A–5 (Comparative Example 7), the yield of the resulting polyethylene was 51 g.

EXAMPLE 26

A 2-liter four-necked flask equipped with a stirrer, a thermometer, an inlet for gaseous nitrogen and an outlet for exahust gas was charged with 3.8 liters of refined kerosene and 120 g. of potassium titanium fluoride. The system was thoroughly substituted with nitrogen while stirring. Then 254 g. of ethyl aluminum dichloride were added to react for 6 hours at a temperature of 60° C.

After completion of the reaction the stirring was ceased and the system was allowed to stand until the temperature was lowered to room temperature. The content of the organoaluminum compound in the supernatant solution was 0.237 mol/l. calculated as aluminum.

Polymerization of propylene was carried out in the procedure of Example 5 except that the supernatant solution was employed in an amount equivalent to 10 millimoles of aluminum to form 92.0 g. of a solid polypropylene having the total I.I. of 93.5%.

What we claim is:

1. A process for the polymerization of a monomer which comprises polymerizing or copolymerizing one or more monomers selected from the group consisting of ethylene, propylene, 1-butene, 3-methyl-1-butene, 1-pentene, 4-methyl-1-pentene, 1-hexene and styrene in the presence of a catalyst, said catalyst consisting essentially of:

(A) a titanium trichloride composition obtained by extracting a crude titanium trichloride composition including an aluminum-containing inorganic substance, said crude titanium trichloride composition being prepared by reducing titanium tetrachloride in an inert hydrocarbon solvent with an organoaluminum chloride expressed by the following formula $$R_{3-n}AlCl_n$$

wherein R is an alkyl group of 1 to 6 carbon atoms or an aryl group, and $n$ is a positive number greater than 0 but smaller than 3, with a mixed solvent composed of (i) a main solvent selected from the group consisting of saturated aliphatic hydrocarbons, aromatic hydrocarbons, halogenated aromatic hydrocarbons, trichloroethylene and carbon disulfide and (ii) an auxiliary solvent selected from the group consisting of (1) an oxygen-containing organic compound selected from the group consisting of aliphatic ethers, aromatic ethers, aliphatic carboxylic acid esters, aromatic carboxylic acid esters, aliphatic alcohols, phenols, aliphatic carboxylic acids, aromatic carboxylic acids, aliphatic carboxylic acid halides, aromatic carboxylic acid halides, aliphatic ketones, aromatic ketones, aliphatic aldehydes and aromatic aldehydes, (2) a nitrogen-containing organic compound selected from the group consisting of aliphatic amines, aromatic amines, heterocyclic amines, aromatic isocyanates and aromatic azo compounds, (3) a silicon-containing organic compound selected from the group consisting of tetrahydrocarbyl silanes, organohydrogenosilanes, organohalogenosilanes, alkoxy silanes, aryloxy silanes, silanol carboxylates, straight chain siloxanes, cyclic polysiloxanes, aminosilanes, silazanes and isocyanate silanes, and (4) thioethers; and substantially separating the resulting titanium trichloride composition from the extract, and (B) an organoaluminum compound selected from the group consisting of trialkylaluminums, dialkylaluminum halides, dialkylaluminum alkoxides, alkylaluminum alkoxy halides, alkylaluminum sesquihalides, reaction products of alkylaluminum dihalides with alkali metal halides, reaction products of alkylaluminum dihalides with alkali metal complex fluorides of transition metals and reaction products of alkylaluminum dihalides with electron-donors.

2. The process of claim 1 wherein said main solvent comprises more than 50% by weight of the mixed solvent and the mixed solvent is used in an amount such that the amount of said main solvent is 2 to 50 parts by weight per part by weight of the crude titanium trichloride composition.

3. A process for the polymerization of a monomer which comprises polymerizing or copolymerizing one or more monomers selected from the group consisting of ethylene, propylene, 1-butene, 3-methyl-1-butene, 1-pentene, 4-methyl-1-pentene, 1-hexene and styrene in the presence of a catalyst, said catalyst consisting essentially of:

(A) a titanium trichloride composition obtained by extracting a crude titanium trichloride composition including an aluminum-containing inorganic substance, said crude titanium trichloride composition being prepared by reducing titanium tetrachloride in an inert hydrocarbon solvent with an organoaluminum chloride expressed by the following formula $$R_{3-n}AlCl_n$$

wherein R is an alkyl group of 1 to 6 carbon atoms or an aryl group, and $n$ is a positive number greater than 0 but smaller than 3, with a mixed solvent composed of (i) a main solvent selected from the group consisting of saturated aliphatic hydrocarbons, aromatic hydrocarbons, halogenated aromatic hydrocarbons, trichloroethylene and carbon disulfide and (ii) an auxiliary solvent selected from the group consisting of (1) an oxygen-containing organic compound selected from the group consisting of saturated aliphatic monethers of 2 to 32 carbon atoms having an alkyl group, aliphatic ethers of 3 to 20 carbon atoms having at least one unsaturated aliphatic hydrocarbon radical, aromatic ethers of 7 to 16 carbon atoms having a saturated alkyl group or aryl group, halogenated mono- and di-ethers of 7 to 16 carbon atoms containing at least one aromatic radical, saturated alkyl esters of saturated aliphatic monocarboxylic acids having an aliphatic monocarboxylic acid residual group of 1 to 21 carbon atoms and a saturated alkyl group of 1 to 16 carbon atoms, unsaturated alkyl esters of saturated aliphatic monocarboxylic acids having a saturated aliphatic monocarboxylic acid residual group of 1 to 8 carbon atoms and an unsaturated alkyl group of 2 to 12 carbon atoms, alkyl esters of unsaturated aliphatic monocarboxylic acids having an unsaturated aliphatic monocarboxylic acid residual group having 2 to 12 carbon atoms and a saturated or unsaturated alkyl group of 1 to 10 carbon atoms, saturated alkyl esters of aromatic monocarboxylic acids having an aromatic monocarboxylic acid residual group of 7 to 18 carbon atoms and a saturated alkyl group of 1 to 20 carbon atoms, saturated aliphatic monoalcohols having 1 to 18 carbon atoms, monohydric and dihydric phenols having 6 to 16 carbon atoms, saturated aliphatic monoketones having 3 to 20 carbon atoms, saturated aliphatic diketones having 4 to 12 carbon atoms, aromatic monoketones having 7 to 18 carbon atoms, aromatic monocarboxylic acids having 7 to 18 carbon atoms, saturated aliphatic monocarboxylic acids having 1 to 20 carbon atoms, saturated aliphatic carboxylic acid halides having 2 to 12 carbon atoms, aromatic carboxylic acid halides having 7 to 15 carbon atoms, alkyl aldehydes in which the alkyl group has 1 to 6 carbon atoms, and aromatic aldehydes in which the aryl group has 6 to 7 carbon atoms, (2) a nitrogen-containing organic compound selected from the group consisting of saturated aliphatic tertiary amines having 3 to 30 carbon atoms, aromatic tertiary amines having 6 to 30 carbon atoms, heterocyclic amines having 5 to 18 carbon atoms and aromatic azo compounds of 12 to 20 carbon atoms which may have a substituent selected from hydrocarbon radicals and halogens, (3) a silicon-containing organic compound selected from the group consisting of tetrahydrocarbylsilanes of 4 to 50 carbon atoms having a substituent selected from a saturated alkyl radical and an aryl radical, tetrahydrocarbylsilanes of 5 to 28 carbon atoms having an unsaturated alkyl radical, alkyl hydrogenosilanes of 1 to 30 carbon atoms having an Si—H bond, aryl hydrogenosilanes of up to 30 carbon atoms having an Si—H bond, alkyl halogenosilanes of 3 to 30 carbon atoms having an Si-halogen bond, aryl halogenosilanes of 6 to 30 carbon atoms having an Si-halogen bond, trialkylsilyl amines of 3 to 18 carbon atoms, triarylsilyl amines of up to 30 carbon atoms, alkoxysilanes of 4 to 20 carbon atoms having an Si—O—C bond, aryloxysilanes of 6 to 40 carbon atoms having an Si—O—C bond; alkylsilyl esters and arylsilyl esters of aliphatic and aromatic monocarboxylic acids composed of trialkyl silanols having 3 to 10 carbon atoms, alkylaryl silanols having 8 to 20 carbon atoms or triarylsilanols having 18 to 30 carbon atoms and aliphatic monocarboxylic acids having 1 to 10 carbon atoms or aromatic monocarboxylic acids having 7 to 11 carbon atoms; trialkyl silicon isocyanates having 3 to 10 carbon atoms, dialkyl aryl silicon isocyanates having 8 to 15 carbon atoms, triaryl silicon isocyantes having 18 to 30 carbon atoms, polysilmethylenes of the formula

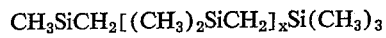

wherein $x$ is an integer up to 10, linear polyalkyl polysilanes having 6 to 80 carbon atoms, polyaryl polysilanes having up to 80 carbon atoms, polyalkyl cyclopolysilanes having 12 to 120 carbon atoms, polyaryl cyclopolysilanes having 12 to 120 carbon atoms, organopolysiloxanes of the formula $A(R'R''SiO)_xSiR_3$ wherein R, R' and R'' may be the same or different and represent an alkyl group having 1 to 4 carbon atoms, an aryl group having 6 to 8 carbon atoms or hydrogen, and $x$ is an integer of 1 to 1000, $\alpha$-, $\omega$-dihalosubstitution products of said organopolysiloxanes, alkyl cyclopolysiloxanes of the formula $(R'''HSiO)_y$ wherein $R'''$ is an alkyl group having 1 to 4 carbon atoms and $y$ is an integer of 3 to 8, alkyl cyclopolysiloxanes of the general formula $(R''''_2SiO)_z$ wherein $R''''$ is an alkyl group having 1 to 4 carbon atoms and $z$ is an integer of 3 to 9, aryl cyclopolysiloxanes of the formula $(Q_2SiO)_p$ wherein Q is an aryl group having 6 to 8 carbon atoms and $p$ is an integer of 3 to 6, alkyl polysilazanes of 6 to 50 carbon atoms having an Si—N—Si bond and a molecular weight of not more than 1000, and aryl polysilazanes of 6 to 50 carbon atoms having an Si—N—Si bond and a molecular weight of not more than 1000, and (4) a thioether selected from the group consisting of aliphatic monothioethers of 2 to 10 carbon atoms and aromatic thioethers of 7 to 12 carbon atoms; and substantially separating the resulting titanium trichloride composition from the extract, and (B) an organoaluminum compound selected from the group consisting of trialkylaluminums, dialkylaluminum halides, dialkylaluminum alkoxides, alkylaluminum alkoxy halides, alkylaluminum sesquihalides, reaction products of alkylaluminum dihalides with alkali metal halides, reactions products of alkylaluminum dihalides with alkali metal complex fluorides of transition metals and reaction products of alkylaluminum dihalides with electron-donors.

4. The process of claim 3, wherein said main solvent (i) comprises more than 50% by weight of the mixed solvent and the amount of said main solvent (i) is 2–50 parts by weight per part by weight of the crude titanium trichloride composition.

5. The process of claim 3, wherein the crude titanium trichloride composition includes said aluminum-containing inorganic substance in an amount of 0.2–1.0 mole calculated as aluminum per mole of titanium.

6. The process of claim 3, wherein said main solvent (i) is selected from the group consisting of saturated aliphatic hydrocarbons having 3–20 carbon atoms, aromatic hydrocarbons having 6–20 carbon atoms and halogenated aromatic hydrocarbons having 6–16 carbon atoms.

7. A catalyst composition consisting essentially of
(A) a titanium trichloride composition obtained by extracting a crude titanium trichloride composition including an aluminum-containing inorganic substance, said crude titanium trichloride composition being prepared by reducing titanium tetrachloride in an inert hydrocarbon solvent with an organoaluminum chloride expressed by the following formula

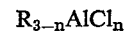

wherein R is an alkyl group of 1 to 6 carbon atoms or an aryl group, and $n$ is a positive number greater than 0 but smaller than 3,
with a mixed solvent composed of (i) a main solvent selected from the group consisting of saturated aliphatic hydrocarbons, aromatic hydrocarbons, halogenated aromatic hydrocarbons, trichloroethylene and carbon disulfide and (ii) an auxiliary solvent selected from the group consisting of
(1) an oxygen-containing organic compound selected from the group consisting of saturated aliphatic monoethers of 2 to 32 carbon atoms having an alkyl group, aliphatic ethers of 3 to 20 carbon atoms having at least one unsaturated aliphatic hydrocarbon radical, aromatic ethers of 7 to 16 carbon atoms having a saturated alkyl group or aryl group, halogenated mono- and di-ethers of 7 to 16 carbon atoms containing at least one aromatic radical, saturated alkyl esters of saturated aliphatic monocarboxylic acids having an aliphatic monocarboxylic acid residual group of 1 to 21 carbon atoms and a saturated alkyl group of 1 to 16 carbon atoms, unsaturated alkyl esters of saturated aliphatic monocarboxylic acids having a saturated aliphatic monocarboxylic acid residual group of 1 to 8 carbon atoms and an unsaturated alkyl group of 2 to 12 carbon atoms, alkyl esters of unsaturated aliphatic monocarboxylic acids having an unsaturated aliphatic monocarboxylic acid residual group having 2 to 12 carbon atoms and a saturated or unsaturated alkyl group of 1 to 10 carbon atoms, saturated alkyl esters of aromatic monocarboxylic acids having an aromatic monocarboxylic acid residual group of 7 to 18 carbon atoms and a saturated alkyl group of 1 to 20 carbon atoms, saturated aliphatic monoalcohols having 1 to 18 carbon atoms, monohydric and dihydric phenols having 6 to 16 carbon atoms, saturated aliphatic monoketones having 3 to 20 carbon atoms, saturated aliphatic diketones having 4 to 12 carbon atoms, aromatic monoketones having 7 to 18 carbon atoms, aromatic monocarboxylic acids having 7 to 18 carbon atoms, saturated aliphatic monocarboxylic acids having 1 to 20 carbon atoms, saturated aliphatic carboxylic acid halides having 2 to 12 carbon atoms, aromatic carboxylic acid halides having 7 to 15 carbon atoms, alkyl aldehydes in which the alkyl group has 1 to 6 carbon atoms, and aromatic aldehydes in which the aryl group has 6 to 7 carbon atoms, (2) a nitrogen-containing organic compound selected from the group consisting of saturated aliphatic tertiary amines having 3 to 30 carbon atoms, aromatic tertiary amines having 6 to 30 carbon atoms, heterocyclic amines having 5 to 18 carbon atoms and aromatic azo compounds of 12 to 20 carbon atoms which may have a substituent selected from hydrocarbon radicals and halogens, (3) a silicon-containing organic compound selected from the group consisting of tetrahydrocarbylsilanes of 4 to 50 carbon atoms having a substituent selected from a saturated alkyl radical and an aryl radical, tetrahydrocarbylsilanes of 5 to 28 carbon atoms having an unsaturated alkyl radical, alkyl hydrogenosilanes 1 to 30 carbon atoms having an Si—H bond, aryl hydrogenosilanes of up to 30 carbon atoms having an Si—H bond, alkyl halogenosilanes of 3 to 30 carbon atoms having an Si-halogen bond, aryl halogenosilanes of 6 to 30 carbon atoms having an Si-halogen bond, trialkylsilyl amines of 3 to 18 carbon atoms, triarylsilyl amines of up to 30 carbon atoms, alkoxysilanes of 4 to 20 carbon atoms having an Si—O—C bond, aryloxysilanes of 6 to 40 carbon atoms having an Si—O—C bond; alkylsilyl esters and arylsilyl esters of aliphatic and aromatic monocarboxylic acids composed of trialkyl silanols having 3 to 10 carbon atoms, alkylarylsilanols having 8 to 20 carbon atoms or triarylsilanols having 18 to 30 carbon atoms and aliphatic monocarboxylic acids having 1 to 10 carbon atoms or aromatic monocarboxylic acids having 7 to 11 carbon atoms; trialkyl silicon isocyanates having 3 to 10 carbon atoms, dialkyl aryl silicon isocyanates having 8 to 15 carbon atoms, triaryl silicon isocyanates having 18 to 30 carbon atoms, polysilmethylenes of the formula

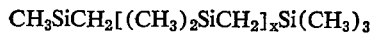

wherein $x$ is an integer up to 10, linear polyalkyl polysilanes having 6 to 80 carbon atoms, polyaryl polysilanes having up to 80 carbon atoms, polyalkyl cyclopolysilanes having 12 to 120 carbon atoms, polyaryl cyclopolysilanes having 12 to 120 carbon atoms, organopolysiloxanes of the formula $R(R'R''SiO)_xSiR_3$ wherein R, R' and R'' may be the same or different and represent an alkyl group having 1 to 4 carbon atoms, an aryl group having 6 to 8 carbon atoms or hydrogen, and $x$ is an integer of 1 to 1000, $\alpha$-, $\omega$-dihalosubstitution products of said organopolysiloxanes, alkyl cyclopolysiloxanes of the formula $(R'''HSiO)_y$ wherein R''' is an alkyl group having 1 to 4 carbon atoms and $y$ is an integer of 3 to 8, alkyl cyclopolysiloxanes of the general formula $(R''''_2SiO)_z$ wherein R'''' is an alkyl group having 1 to 4 carbon atoms and $z$ is an integer of 3 to 6, alkyl polysilaxanes of 6 to the formula $(Q_2SiO)_p$ wherein Q is an aryl group having 6 to 8 carbon atoms and $p$ is an integer of 3 to 6, alkyl polysilazanes of 6 to 50 carbon atoms having an Si—N—Si bond and a molecular weight of not more than 1000, and aryl polysilazanes of 6 to 50 carbon atoms having an Si—N—Si bond and a molecular weight of not more than 1000, and (4) a thioether selected from the group consisting of aliphatic monothioethers of 2 to 10 carbon atoms and aromatic thioethers of 7 to 12 atoms; and substantially separating the resulting titanium trichloride composition from the extract, and (B) an organoaluminum compound selected from the group consisting of trialkylaluminums, dialkylaluminum halides, dialkylaluminum alkoxides, alkylaluminum alkoxy halides, alkylaluminum sesquihalides, reaction products of alkylaluminum dihalides with alkali metal halides, reaction products of alkylaluminum dihalides with alkali metal complex fluorides of transition metals and reaction products of alkylaluminum dihalides with electron-donors.

8. The catalyst of claim 7 wherein said main solvent comprises more than 50% by weight of the mixed solvent and the mixed solvent is used in an amount such that the amount of said main solvent is 2 to 50 parts by weight per part by weight of the crude titanium trichloride composition.

9. A catalyst composition consisting essentially of (A) a titanium trichloride composition obtained by extracting a crude titanium trichloride composition including an aluminum-containing inorganic substance, said crude titanium trichloride composition being prepared by reducing titanium tetrachloride in an inert hydrocarbon solvent with an organoaluminum chloride expressed by the following formula

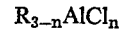

wherein R is an alkyl group of 1 to 6 carbon atoms or an aryl group, and $n$ is a positive number greater than 0 but smaller than 3, with a mixed solvent composed of (i) a main solvent selected from the group consisting of saturated aliphatic hydrocarbons, aromatic hydrocarbons, halogenated aromatic hydrocarbons, trichloroethylene and carbon disulfide and (ii) an auxiliary solvent selected from the group consisting of (1) an oxygen-containing organic compound selected from the group consisting of aliphatic ethers, aromatic ethers, aliphatic carboxylic acid esters, aromatic carboxylic acid esters, aliphatic alcohols, phenols, aliphatic carboxylic acids, aromatic carboxylic acids, aliphatic carboxylic acid halides, aromatic carboxylic acid halides, aliphatic ketones, aromatic ketones, aliphatic aldehydes and aromatic aldehydes, (2) a nitrogen-containing organic compound selected from the group consisting of aliphatic amines, aromatic amines, heterocyclic amines, aromatic isocyanates and aromatic azo compounds, (3) a silicon-containing organic compound selected from the group consisting of tetrahydrocarbyl silanes, organohydrogenosilanes, organohalogenosilanes, alkoxy silanes, aryloxy silanes, silanol carboxylates, straight chain siloxanes, cyclic polysiloxanes, aminosilanes, silazanes and isocyanate silanes, and (4) thioethers; and substantially separating the resulting titanium trichloride composition from the extract, and (B) an organoaluminum compound selected from the group consisting of trialkylaluminum dialkylaluminum halides, dialkylaluminum alkoxides, alkylaluminum alkoxy halides, alkylaluminum sesquihalides, reaction products of alkylaluminum dihalides with alkali metal halides, reaction products of alkylaluminum dihalides with alkali metal complex fluorides of transition metals and reaction products of alkylaluminum dihalides with electron-donors.

10. The catalyst of claim 9 wherein said main solvent comprises more than 50% by weight of the mixed solvent and the mixed solvent is used in an amount such that the amount of said main solvent is 2 to 50 parts by weight per part by weight of the crude titanium trichloride composition.

References Cited

UNITED STATES PATENTS

| | | | |
|---|---|---|---|
| 3,558,271 | 1/1971 | Calcagno | 260—94.9 C |
| 3,130,005 | 4/1964 | Siggel et al. | 260—94.9 C |
| 3,058,970 | 10/1962 | Rust et al. | 260—94.9 E |
| 3,117,834 | 1/1964 | Siggel et al. | 260—94.9 C |
| 3,476,730 | 11/1969 | Streck et al. | 260—94.9 C |
| 3,345,351 | 10/1967 | McCall et al. | 260—94.9 E |

FOREIGN PATENTS

| | | | |
|---|---|---|---|
| 943,199 | 12/1963 | Great Britain | 260—94.9 E |
| 12,634 | 7/1966 | Japan. | |
| 2,052,525 | 6/1971 | Germany. | |

JOSEPH L. SCHOFER, Primary Examiner

E. J. SMITH, Assistant Examiner

U.S. Cl. X.R.

252—429 B, 429 C; 260—88.2 B, 93.7, 94.9 C, 94.9 E

UNITED STATES PATENT OFFICE
CERTIFICATE OF CORRECTION

Patent No. 3,825,524    Dated    July 23, 1974

Inventor(s)    Shigeru WADA ET AL

It is certified that error appears in the above-identified patent and that said Letters Patent are hereby corrected as shown below:

Column 17, line 122 of claim 7: cancel "3 to 6, alkyl polysilaxanes of 6 to" and substitute therefor -- 3 to 9, aryl cyclopolysiloxanes of --

Column 17, line 133 of claim 7: after "7 to 12" insert -- carbon --

Signed and sealed this 28th day of January 1975.

(SEAL)
Attest:

McCOY M. GIBSON JR.
Attesting Officer

C. MARSHALL DANN
Commissioner of Patents